US006996729B2

(12) United States Patent
Volkening et al.

(10) Patent No.: US 6,996,729 B2
(45) Date of Patent: Feb. 7, 2006

(54) DSL COMMUNICATION APPARATUS WITH LIFELINE FUNCTIONALITY SUITABLE FOR TRANSMITTING AND RECEIVING VOICE SIGNALS DURING POWER FAILURE

(75) Inventors: Ingo Volkening, Munich (DE); Jochen Kraus, Munich (DE); Gunther Fenzl, Unterbiberg (DE)

(73) Assignee: Infineon Technologies AG, Munich (DE)

( * ) Notice: Subject to any disclaimer, the term of this patent is extended or adjusted under 35 U.S.C. 154(b) by 564 days.

(21) Appl. No.: 10/217,066

(22) Filed: Aug. 12, 2002

(65) Prior Publication Data

US 2004/0027992 A1    Feb. 12, 2004

(30) Foreign Application Priority Data

Jul. 29, 2002   (EP)   .................................. 02016821

(51) Int. Cl.
    *G06F 1/26*   (2006.01)
    *H04M 1/00*   (2006.01)
(52) U.S. Cl. ........................... 713/300; 713/2; 379/413
(58) Field of Classification Search ................ 713/300, 713/2; 379/27.01, 413, 93.06
    See application file for complete search history.

(56) References Cited

U.S. PATENT DOCUMENTS

| 5,883,941 | A  | * | 3/1999 | Akers ........................ 379/93.08 |
| 6,028,916 | A  |   | 2/2000 | Beveridge ................... 379/56.2 |
| 6,272,209 | B1 | * | 8/2001 | Bridger et al. ............ 379/27.01 |
| 6,400,803 | B1 | * | 6/2002 | Tate et al. ................ 379/27.06 |
| 6,574,313 | B1 | * | 6/2003 | Chea et al. ............... 379/93.09 |
| 6,647,117 | B1 | * | 11/2003 | Wallace et al. ............. 379/413 |
| 6,683,951 | B1 | * | 1/2004 | Getchell ................. 379/413.02 |
| 6,810,041 | B2 | * | 10/2004 | Walker et al. .............. 370/397 |
| 6,847,718 | B1 | * | 1/2005 | Hiraoka ...................... 379/413 |
| 2004/0213404 | A1 | * | 10/2004 | Posthuma .................... 379/413 |

FOREIGN PATENT DOCUMENTS

| EP | 1189422 | 3/2002 |
| WO | 9921311 | 4/1999 |
| WO | 0113622 | 2/2001 |
| WO | 0117219 | 3/2001 |
| WO | 0189262 | 11/2001 |

* cited by examiner

Primary Examiner—Chun Cao
(74) Attorney, Agent, or Firm—Husch & Eppenberger LLC; Grant D. Kang

(57) ABSTRACT

A DSL communication apparatus with lifeline functionality is provided, the DSL communication apparatus (3) in particular being suitable for CVoDSL ("Channelized Voice over Digital Subscriber Line") transmission. The DSL communication apparatus (3) comprises a central processing unit (11) which detects a local power failure state of a local power supply unit (23) being associated with the DSL communication apparatus (3). In this case, the central processing unit (11) changes the operation of the DSL communication apparatus (3) from a normal operation mode to an intermediate operation mode, generates an interrupt for stopping a voice coprocessor unit (8), initializes a download of a lifeline operation firmware from a FLASH memory (12) to the voice coprocessor unit (8), and then starts a new initialization of the voice coprocessor unit (8). Thereafter, the central processing unit (11) changes the operation of the DSL communication apparatus (3) from the intermediate operation mode to the lifeline operation mode by switching the power supply of the DSL communication apparatus (3) from the local power supply unit (23) to an auxiliary power supply unit (20) being coupled to the transmission line (1).

22 Claims, 2 Drawing Sheets

Figure 1:
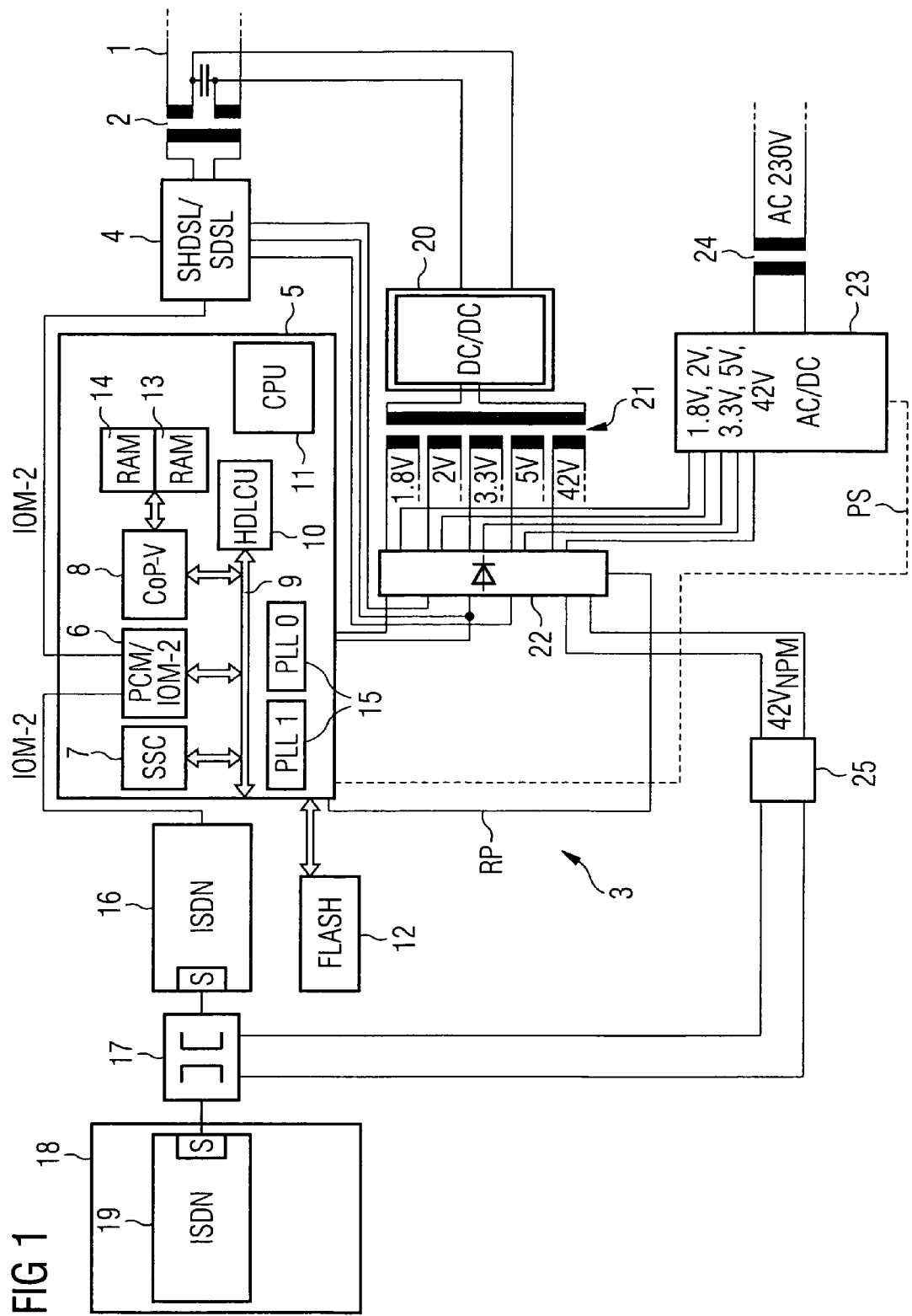

DSL COMMUNICATION APPARATUS WITH LIFELINE FUNCTIONALITY SUITABLE FOR TRANSMITTING AND RECEIVING VOICE SIGNALS DURING POWER FAILURE

The present invention relates to an DSL communication apparatus with lifeline functionality. In particular, the present invention relates to an DSL communication apparatus with lifeline functionality which is suitable for transmitting and receiving DSL signals comprising voice signals, preferably CVoDSL ("Channelized Voice over DSL") over a transmission line of an DSL communication network.

Today's and upcoming xDSL systems have to provide higher bit rates. On the other hand, the upcoming xDSL systems are supposed not to use the POTS ("Plain Old Telephone Service") or ISDN ("Integrated Service Digital Network") frequency basebands any longer. These basebands, however, are usually used for transmitting voice signals together with the xDSL data signals over an xDSL transmission line in prior art xDSL communication networks. For example, in ADSL ("Asymmetrical Digital Subscriber Line") communication networks, voice signals are transmitted in the lower frequency range of the POTS or ISDN frequency baseband, while the data signals are transmitted in a higher frequency range. The POTS or ISDN basebands are also used for offering the so-called lifeline telephone service. The lifeline telephone service allows the use of a telephone, for example in the case of an emergency, even if the local power supply of the respective telephone were inactive or defective. Therefore, a user of the telephone can make a call even if the local power supply of the telephone is broken down.

There is a plurality of different xDSL systems which, for example, can be distinguished in terms of the transmission medium used (e.g. copper line, power line, radio transmission, optical fiber etc.), the direction of transmission (e.g. simplex, semi-duplex or duplex), or the symmetry of the data transmission (symmetrical or asymmetrical) etc. The traditional xDSL technologies use a copper line both for the downstream direction (i.e. from the communication service provider to the subscriber terminal equipment) and the upstream direction (i.e. from the subscriber terminal equipment to the communication service provider). SDSL systems ("Symmetrical Digital Subscriber Line") use the same bit rate for the downstream and upstream directions, while ADSL systems ("Asymmetrical Digital Subscriber Line") use different bit rates for the upstream and downstream directions. In particular, in ADSL systems, the bit rate used for the downstream direction is significantly larger than that used for the upstream direction.

In general, there are essentially three ways to transport voice signals over a copper phone line using DSL bandwidth.

According to the VoATM technology ("Voice over Asynchronous Transfer Mode"), digitized voice and emulated signalling information is put into ATM cells which are transported over the phone line and through the network over a dedicated ATM private virtual connection. In the so-called VoIP technology ("Voice over Internet Protocol"), digital voice and emulated signalling information is put into IP packets and then transported across the phone line along with other data.

The third method is the CVoDSL technology ("Chanellized Voice over Digital Subscriber Line"). CVoDSL technology is unique among voice over DSL solutions in that it transports voice within the physical layer, allowing transport of derived voice channels over DSL bandwidth while maintaining both POTS and high speed internet access. The result is a simple, flexible, cost-effective method to enable next-generation equipment with derived voice functionality. CVoDSL reserves 64 kbit/s channels (SDSL) or 32 kbit/s channels (ADSL) of DSL bandwidth to deliver voice signals within the DSL bandwidth. This approach eliminates the need for packetization of voice traffic over the phone line into higher protocols such as ATM and IP. Multiple voice lines can be active simultaneously. CVoDSL technology also accommodates the use of an analogue dial-up data or fax modem over DSL bandwidth.

Attempts have been made to incorporate CVoDSL technology into applicable xDSL standards.

SHDSL stands for "Single Pair High Speed Digital Subscriber Line". The European variant of this technology is called "Symmetrical Single Pair High Bit Rate Digital Subscriber Line" (SDSL). The existing standards are the ITU-T Recommendation G.991.2 (G.shdsl) and the ETSI TS 101 524. The North American variant HDSL2 is included in an optional annex of G.991.2. SHDSL supports bit rates from 192 kbit/s to 2320 kbit/s (granularity or resolution 8 kbit/s) uses the TC-PAM linecode ("Trellis Coded Pulse Amplitude Modulation"), and typically provides services such as T1, Fractional T1, E1, Fractional E1, and ISDN Primary Rate. SHDSL supports VoATM and CVoDSL (which is also known as VoSTM ("Voice over Synchronous Transfer Mode")). For CVoDSL, it requires latency of 0.5 ms or less for bit rates greater than 1.5 Mbit/s, and latency of 1.25 ms or less for bit rates less than 1.5 Mbit/s.

CVoDSL is also defined for Recommendation G.dmt.bis which describes ADSL transceivers on a metallic twisted pair that allows high speed data transmission between the network operator and (which is also called ATU-C ("ADSL Termination Unit-Central")) and the customer end (which is also called ATU-R ("ADSL Termination Unit-Remote")). This recommendation provides a variety of bearer channels in conjunction with one of three other services dependent on the environment: 1) ADSL transmission simultaneously on the same pair with voice (band) service, 2) ADSL transmission simultaneously on the same pair with G.961.2 (Appendix I or II) ISDN services, or 3) ADSL transmission on the same pair with voice-band transmission and with TCM-ISDN transmission ("Time Compression Modulation", "Trellis Coded Modulation") (G.961 Appendix III) in an adjacent pair. ADSL systems allow approximately a bit rate of 8 Mbit/s in the downstream direction and 800 kbit/s in the upstream direction depending on the deployment and noise environment.

As already indicated above, today's lifeline solutions make either use of the frequency baseband, which means e.g. a splitter based ADSL system, in a static or dynamic assignment of the supported phones switched to the baseband POTS or ISDN channel. Therefore, a disadvantage associated with current solutions is that two parallel access network systems (baseband POTS/ISDN and xDSL) have to be maintained simultaneously.

There is no existing system solution for an intelligent xDSL network termination (NT) offering a combination of hardware/software to allow a dynamic switching between packetized voice (VoATM or VoIP) to a lifeline telephone channel using CVoDSL.

Therefore, the object underlying the present invention is to provide an DSL communication apparatus with improved lifeline functionality. In particular, the object underlying the present invention is to provide an DSL communication apparatus with improved lifeline functionality which overcomes the above problems and is suitable for CVoDSL technology.

According to the present invention, this object is achieved by an DSL communication apparatus with lifeline functionality as defined in claim 1. The dependent claims define preferred and advantageous embodiments of the present invention.

The DSL communication apparatus of the present invention comprises an DSL transceiver unit for transmitting and receiving DSL signals comprising voice signals, in particular CVoDSL signals, over a transmission line of an DSL communication network. Furthermore, the DSL communication apparatus comprises a voice signal interface unit for transmitting voice signals extracted from the DSL signals received from the DSL transceiver unit to a subscriber terminal equipment, and for receiving voice signals from the subscriber terminal equipment and transferring the voice signals to the DSL transceiver unit for transmission of respective DSL signals comprising the voice signals over the transmission line. In particular, the voice signal interface unit may be an ISDN interface unit, and the subscriber terminal equipment is preferably an ISDN telephone. Moreover, the DSL communication apparatus comprises control means for monitoring the status of a local power supply unit associated with the DSL communication apparatus. The local power supply unit is provided for providing a local supply voltage for the DSL communication apparatus in a normal operation mode. By monitoring the status of the local power supply unit, the control means can detect a local power failure state of the local power supply unit and, in this case, change the operation of the DSL communication apparatus to a lifeline operation mode by activating an auxiliary supply voltage provided by an auxiliary power supply unit which is coupled to the transmission line for deriving or extracting the auxiliary supply voltage from the transmission line. Therefore, in the lifeline operation mode, the DSL communication apparatus is operated with the auxiliary supply voltage.

Preferably, the control means comprise a central processor unit for monitoring the status of the local power supply unit and for activating the lifeline operation after having detected the local power failure state, and a voice coprocessor unit being provided i.a. for processing the voice signals. After having detected the local power failure state of the local power supply unit, the central processing unit may change to an intermediate state or an intermediate operation mode before activating the lifeline operation mode. In this intermediate state, an interrupt may be generated for stopping the voice coprocessor unit as well as external or peripheral modules of the DSL communication apparatus. Thereafter, the central processing unit may initiate a download of the firmware comprising the instruction code needed by the voice coprocessor unit for the lifeline operation. After having re-directed the interrupt to the voice co-processor unit, the central processing unit may initialize or boot the voice coprocessor unit, which comprises clock gating of the voice coprocessor unit and initialization of the subscriber terminal equipments. Thereafter, the central processing unit changes the operation of the DSL communication apparatus to the lifeline operation described above. If the control means detect that the local power failure status is left again by the local power supply unit, i.e. the local power supply unit is active again and allows a proper operation of the DSL communication apparatus as well as the subscriber terminal equipments associated therewith, the control means may initiate a reset of the whole DSL communication apparatus which comprises a reset and a new boot operation both of the central processing unit and the voice coprocessor unit.

The local power supply unit is preferably an AC/DC converter, while the auxiliary power supply unit is preferably an DC/DC converter coupled to the transmission line.

The local power failure state of the local power supply unit may be monitored and detected by evaluating the signal level of a respective pin of the local power supply unit. In addition, the control means may generate a control signal, depending on the state of the local power supply unit, which is used as a selection signal for selecting between the local supply voltage provided by the local power supply unit and the auxiliary supply voltage provided by the auxiliary power supply unit.

As already indicated above, the voice signal interface unit of the DSL communication apparatus of the present invention is preferably an ISDN interface unit. However, as a matter of course, the present invention is not limited to this preferred embodiment, but is also applicable to the operation with analogue subscriber terminal equipments, such as analogue telephones. Therefore, the voice signal interface unit may also be a POTS interface unit. The DSL transceiver unit is preferably an SHDSL/SDSL transceiver unit, however, again without being limited to this preferred embodiment. Of course, the present invention is suitable for the operation with any kind of xDSL signals comprising voice signals. According to a preferred embodiment, however, the voice signals are CVoDSL signals.

Hence, the present invention provides a complete system solution for CVoDSL compliant access network requirements as described above. In particular, the present invention fulfils the requirements for e.g. SHDSL systems to live with a maximum of approximately 2 W drawn by the whole CPE equipment ("Consumer Premise Equipment").

In the following, a preferred embodiment of the present invention will be described with reference to the drawings.

Figure 2:
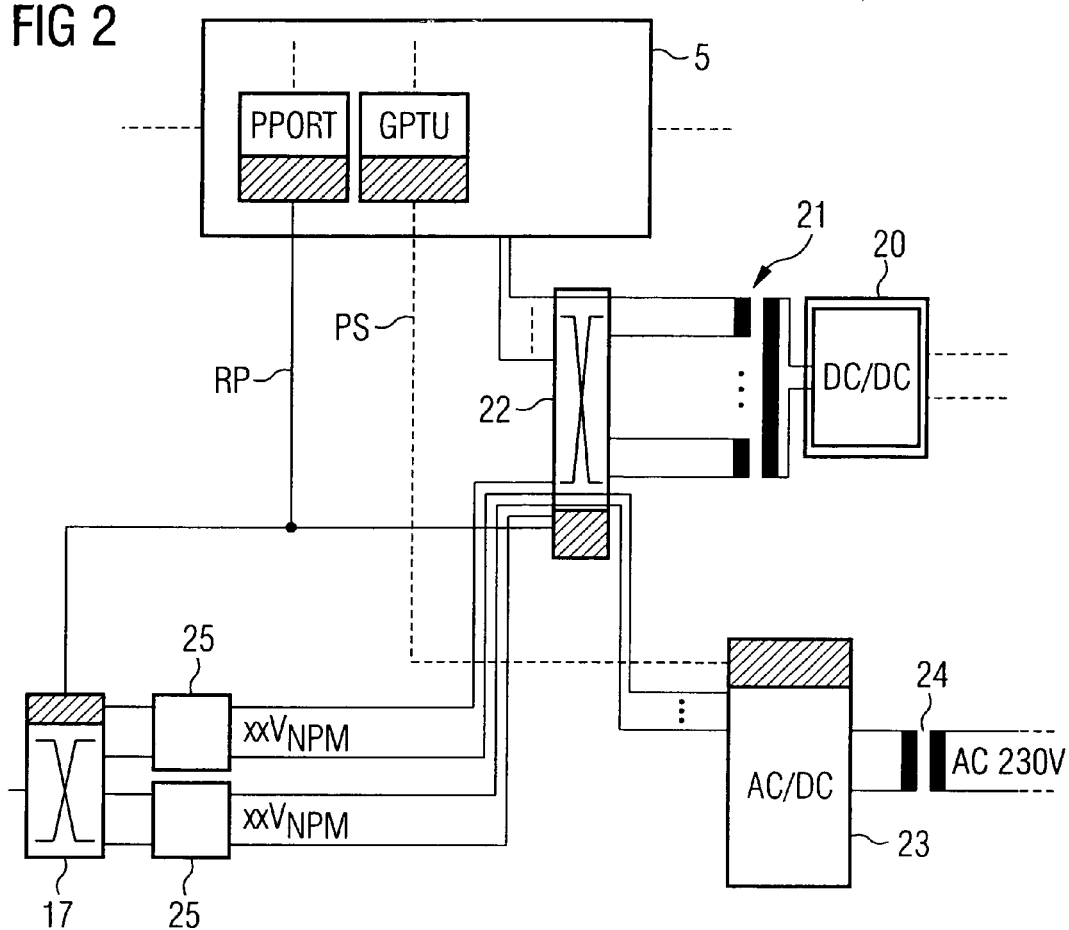
Figure 3:
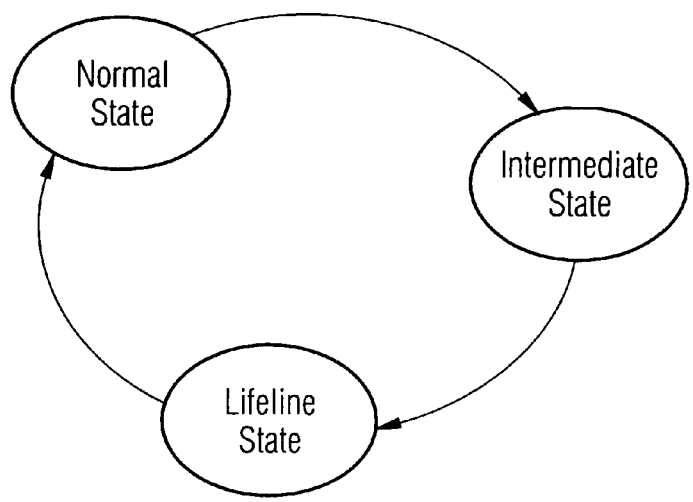

FIG. 1 shows a circuit arrangement of an SHDSL/SDSL communication apparatus with lifeline functionality for CVoDSL voice signals, FIG. 2 shows a part of the circuit arrangement of FIG. 1 in more detail, and FIG. 3 shows a state diagram depicting different operation modes of the SHDSL/SDSL communication apparatus and a central processing unit (CPU) thereof, respectively.

FIG. 1 shows a circuit arrangement of a preferred embodiment of an SHDSL/SDSL communication apparatus with lifeline functionality according to the present invention. The circuit arrangement shown in FIG. 1, for example, may be incorporated into a linecard or a modem etc. associated with a respective network termination (NT). In the embodiment shown in FIG. 1, the circuit arrangement is provided for operation with an ISDN terminal equipment (TE). As a matter of course, however, the circuit arrangement can be used for analogue terminal equipments as well. Furthermore, in general, the circuit arrangement can also be used for other xDSL communication technologies.

As shown in FIG. 1, the communication apparatus comprises an SHDSL/SDSL transceiver 4 which is coupled through a transformer 2 to a transmission line 1 of a respective communication network. The SHDSL/SDSL transceiver 4 is provided for transmitting and receiving SHDSL/SDSL signals, which in particular comprise voice signals, over the transmission line 1. The SHDSL/SDSL transceiver 4 is coupled to a module 5 which is distributed by the applicant, Infineon Technologies AG, under the trademark EasyPort™. This module 5 comprises an PCM/IOM-2 interface unit 6 ("Pulse Code Modulation"/"ISDN Oriented Module") for transferring ISDN voice signals between the module 5 and the SHDSL/SDSL transceiver 4. In addition, the interface unit 6 is provided for transferring ISDN voice signals between the module 5 and an ISDN S-bus terminal 16. The ISDN S-bus terminal 16 is coupled to a transformer 17 which, on the other hand, is coupled to an ISDN S-terminal 19 of an ISDN subscriber terminal equipment 18 which, for example, is an ISDN telephone.

As shown in FIG. 1, the SHDSL/SDSL transceiver 4, the components of the module 5 as well as the transformer 17 (which is provided for driving the ISDN S-bus) are operated with a supply voltage being provided by a local power supply unit 23. Thus, the local power supply unit 23 is associated with the respective SHDSL/SDSL communication apparatus 3 shown in FIG. 1 as well as the respective ISDN subscriber terminal equipment 18 coupled to this SHDSL/SDSL communication apparatus 3. In the embodiment shown in FIG. 1, the local power supply unit 23 is an AC/DC converter which comprises a plurality of supply voltage outputs for providing a supply voltage of 1.8V, 2V, 3.3V, 5V and 42V, for example. The AC/DC converter 23 is coupled through a transformer 24 to an AC 230V power supply means so as to derive the different supply voltages therefrom. The different supply voltages generated by the local power supply unit 23 (AC/DC converter) are supplied to a selection unit 22 which is preferably configured in the form of a software circuit. The selection unit 22 selects the effective supply voltage for the SHDSL/SDSL transceiver 4, the module 5 and the transformer 17, respectively. As depicted in FIG. 1, there is a current limiter 25 connected between the transformer 17 and the selection unit 22.

As shown in FIG. 1, the module 5 comprises a voice bus 9 to which the PCM/IOM-2 interface unit 6 is connected. In addition, a serial control interface unit 7 ("Synchronous Serial Channel", SSC) for the transmission of configuration data is coupled to the voice bus 9. An HDLCU unit 10 ("High Speed Data Link Protocol") for processing ISDN D-channels is also coupled to the voice bus 9. The module 5 furthermore comprises 1 or more phase locked loops 15 (PLL) for generating clock signals which may be used for the operation of the different components of the module 5.

A FLASH-memory 12, which is connected to the module 5 via a standard microcontroller interface, holds the instruction code for a central processing unit (CPU) 11. When the whole system is booted, the instruction code stored in the FLASH memory 12 is downloaded into the central processing unit 11. The central processing unit 11 is provided for controlling the overall operation of the SHDSL/SDSL communication apparatus 3.

As regards the processing of the voice signals to be transmitted from the SHDSL/SDSL transceiver 4 to the ISDN S-bus 16 or vice versa, a coprocessor 8 ("Coprocessor Voice", CoP-V) is provided. This voice coprocessor 8 is also coupled to an instruction memory 13, preferably in the form of an RAM memory ("Random Access Memory"), as well as a data memory 14, also preferably a RAM memory. FIG. 1 shows only some of the internal components of the module 5. In addition, there may be a plurality of external or peripheral modules which are not shown in FIG. 1.

In FIG. 1, a DC/DC converter 20 is shown which, on the one hand, is coupled to the selection unit 22 via a transformer 21 and, on the other hand, via a capacitor to the transformer 2 of the transmission line 1. This DC/DC converter 20 as well as the respective transformer 21 serve as an auxiliary power supply unit which is required for the lifeline operation of the communication apparatus 3 as well as the ISDN terminal equipment 18. This will be explained in the following in more detail.

The whole lifeline functionality can be described (on an abstract level) by means of a state machine, the state diagram thereof being shown in FIG. 3. When the module 5 boots the first time in normal operation mode, the existence of the software module for the lifeline support will be checked. The software module is running on the central processing unit 11 of the module 5. In this normal operation, the central processing unit 11 monitors via interrupt the status of the local power supply unit 23 in order to detect a local power failure. In particular, a local power failure can be detected by means of a power status pin (PS) of the local power supply unit 23. The respective signal bears reference sign PS in FIG. 1. A low level of signal PS indicates that the local power supply unit is inactive, i.e. a local power failure has occurred. On the other hand, a high level indicates that the local power supply is active. Typically the power status pin is not evaluated after a reset of the module 5. If the signal PS changes from the high level to the low level in the normal operation, the central processing unit 11 detects that a local power failure has occurred and generates a high priority interrupt, and an interrupt routine is started which is processed in an intermediate state or intermediate operation mode shown in FIG. 3.

In the lifeline intermediate state, a "reverse polarity" pin of the module 5 will be set from the former low level to the high level. The corresponding signal bears reference sign RP in FIG. 1. This is the condition to reach the lifeline state. The "reverse polarity" functionality is used to ensure a galvanic separation of the local power supply and the remote power feeding effected by the auxiliary power supply unit 20, 21.

However, before reaching the lifeline state, in the intermediate state the following actions are performed by means of the lifeline software interrupt routine:

First of all, the voice coprocessor 8 is activated through a mailbox for sending a respective message to the SHDSL/SDSL transceiver 4. Thereafter, the voice coprocessor 8 is stopped. In addition, all external/peripheral modules of the module 5 are stopped in order to decrease the power drawn by the whole CPE equipment ("Consumer Primais Equipment").

Thereafter, the central processing unit 11 initiates at download of the lifeline firmware module stored in the FLASH-memory 12 to the instruction memory 13 coupled to the voice coprocessor 8. This firmware comprises the lifeline instruction code for the voice coprocessor 8. The data memory 14 is provided for buffering of data processed by the voice coprocessor 8. Thus, the voice coprocessor 8 is now ready for the lifeline operation.

Then, the interrupt of the PS pin is re-directed to the voice coprocessor 8, and the edge detection is changed etc. Thereafter, a respective configuration image of the configuration of the voice coprocessor 8 is stored in the FLASH-memory 12.

The central processing unit 12 initiates then a boot or initialisation of the voice coprocessor 8 which, e.g., includes clock gating of the voice coprocessor 8 as well as an initialisation of the power-down mode. The clock gating mode allows to switch different clock domains onto the voice coprocessor 8. The voice bus 9 is operated with a predetermined clock frequency. By means of the clock gating mode, the voice coprocessor 8 can be operated with a higher clock frequency, for example with twice the clock frequency of the voice bus 9. Up to this point, the power supply of the whole apparatus is effected by a battery power supply which is associated with the local power supply unit 23, 24 in the form of a battery back-up. The battery back-up may also be incorporated into the local power supply unit 23.

Then, the central processing unit 11 initiates the lifeline state/lifeline operation shown in FIG. 3. As already discussed above, the control signal RP is set to the high level which causes the selection unit 22 to change the power supply of the whole apparatus from the local power supply unit 23 to the auxiliary power supply unit 20, 21. As already mentioned above, the DC/DC converter 20 is coupled to the transmission line 1. Over this transmission line 1, from the central office or network operator and a feeding voltage is transmitted together with the xDSL signals. This feeding voltage is tapped by the DC/DC converter 20 and, in conjunction with the transformer 21, used for the generation of auxiliary supply voltages ranging from 1.8V to 42V, for example, as indicated in FIG. 1. In the lifeline operation mode, these auxiliary supply voltages are selected by the selection unit 22 for the power supply of the module 5, the SHDSL/SDSL transceiver 4 as well as the ISDN S-bus etc. so as to maintain at least a minimum functionality of the DSL communication apparatus 3 and the ISDN terminal equipment 18 for making an emergency call.

After the power supply has been switched from the local power supply unit 23 to the auxiliary power supply unit 20, 21, the lifeline operation is active, i.e. irrespective of the defective local power supply unit a user can use the ISDN terminal equipment 18 (ISDN telephone) for an emergency call. The dedicated lifeline terminal equipment 18 was initialized by the voice coprocessor 8 during the lifeline software interrupt routine carried out in the intermediate state. In the lifeline operation mode, only the most relevant components of the module 5, in particular the components shown in FIG. 1 relating to the voice engine of the device as well as the phase locked loops 15, are active in order to reduce the maximum power drawn by the whole CPE equipment.

In the lifeline operation mode, the lifeline ISDN terminal equipment 18 can be operated in a standard compliant manner. Therefore, a detailed description with respect to the lifeline operation of the ISDN terminal equipment can be omitted.

The SHDSL/SDSL communication apparatus 3 remains in the lifeline operation mode as long as the signal PS indicates that the local power supply unit 23 is inactive. If the signal PS returns from the low level to the high level (indicating that the local power supply unit 23 is active again), this event is detected by evaluation of the signal PS, and the voice coprocessor 8 will initiate a software triggered reset of the whole module 5. The complete module 5 is then initialized or booted again, and the instruction code for the central processing unit 11 is downloaded from the FLASH-memory 12 into the central processing unit 11. Thereby, the SHDSL/SDSL communication apparatus 3 and the module 5 thereof, respectively, return to the normal operation again (see FIG. 3).

FIG. 2 shows a more detailed depiction of the lifeline detection logic incorporated in the module 5. As shown in FIG. 2, the detection signal PS is evaluated through a general purpose timer unit (GPTU) of the module 5. Such a general purpose timer unit realizes timer events and can be used for the detection of edge changes in the detection signal PS. On the other hand, the control signal RB is generated by means of a parallel port (PPORT) which is a free programmable standard port. The remaining components of FIG. 2 correspond to those shown in FIG. 1 and already described above.

What is claimed is:

1. An improved DSL communication apparatus with lifeline functionality comprising:
   a DSL transceiver unit for transmitting and receiving DSL signals, wherein said DSL signals comprise voice signals, over a transmission line of a DSL communication network;
   a voice signal interface unit for transmitting voice signals extracted from said DSL signals received by said DSL transceiver unit to subscriber terminal equipment and for receiving voice signals from said subscriber terminal equipment and forwarding said voice signals to said DSL transceiver unit for transmission of said DSL signals;
   a control unit comprising a central processing unit and a voice coprocessor unit; and
   a memory unit;
   said control unit being in operative communication with a local power supply unit, wherein said local power supply unit is configured to provide a local supply voltage for said DSL communication apparatus in a normal operation mode;
   said control unit being configured to detect a local power failure state of said local power supply unit;
   said control unit being further configured such that, if said control unit detects said local power failure state, said control unit changes an operational mode of said DSL communication apparatus to a lifeline operation mode by activating an auxiliary supply voltage provided by an auxiliary power supply unit, said auxiliary power supply unit being coupled to said transmission line;
   said control unit being further configured to operate said DSL communication apparatus with said auxiliary supply voltage in said lifeline operation mode;
   said central processing unit being configured to monitor a status of said local power supply unit and activate said lifeline operation mode after having detected said local power failure state;
   said voice coprocessor unit being configured to process said voice signals;
   said central processing unit, after having detected said local power failure state and before changing said operational mode of said DSL communication apparatus from said normal operation mode to said lifeline operation mode, being configured to change said operational mode of said DSL communication apparatus to an intermediate operation mode and generate an interrupt for stopping said voice coprocessor unit;
   said memory unit being integral to said central processing unit and being configured to store a lifeline operation instruction code for said voice coprocessor unit, wherein said central processing unit is further configured to initiate a download of said lifeline operation instruction code from said memory unit to said voice coprocessor unit after having stopped said voice coprocessor unit in said intermediate operation mode.

2. The improved DSL communication apparatus according to claim 1 wherein said voice coprocessor unit is coupled to said voice signal interface unit through a bus.

3. The improved DSL communication apparatus according to claim 1 wherein said central processing unit is further configured to generate said interrupt for an additional purpose of stopping at least one external module of said DSL communication apparatus in said intermediate operation mode.

4. The improved DSL communication apparatus according to claim 1 wherein said central processing unit, when in said intermediate operation mode, is further configured to initiate a download of firmware from said memory unit to said voice coprocessor unit, said firmware comprising said lifeline operation instruction code for said voice coprocessor unit.

5. The improved DSL communication apparatus according to claim 1 wherein said central processing unit is further configured to redirect said interrupt to said voice coprocessor unit after having initiated said download of said lifeline operation instruction code from said memory unit to said voice coprocessor unit.

6. The improved DSL communication apparatus according to claim 1 wherein said central processing unit, after having initiated said download of said lifeline operation instruction code from said memory unit to said voice coprocessor unit, is further configured to effect initialization of said voice coprocessor unit.

7. The improved DSL communication apparatus according to claim 6 wherein said voice coprocessor unit is coupled to said voice signal interface unit through a bus, and said initialization of said voice coprocessor unit comprises a clock gating operation of said coprocessor unit so as to operate said voice coprocessor unit with a clock frequency higher than a clock frequency of said bus.

8. The improved DSL communication apparatus according to claim 6 wherein said initialization of said voice coprocessor unit comprises an initialization of said subscriber terminal equipment by said voice coprocessor unit.

9. The improved DSL communication apparatus according to claim 6 wherein said central processing unit is further configured to change said operation of said DSL communication apparatus from said intermediate operation mode to said lifeline operation mode after having effected said new initialization of said voice coprocessor unit.

10. The improved DSL communication apparatus according to claim 1 further comprising:
 a battery back-up unit being associated with said local power supply unit for providing said local supply voltage during said intermediate operation mode.

11. The improved DSL communication apparatus according to claim 1 wherein said control unit is further configured to detect if said local power supply unit leaves said local power failure state, whereupon said control unit is further configured to initiate a reset of said DSL communication apparatus.

12. The improved DSL communication apparatus according to claim 1 wherein said local power supply unit comprises an AC/DC converter.

13. The improved DSL communication apparatus according to claim 1 wherein said auxiliary power supply unit comprises a DC/DC converter being coupled to said transmission line.

14. The improved DSL communication apparatus according to claim 1 wherein said auxiliary supply voltage is further configured to drive said subscriber terminal equipment when said DSL communication apparatus is in said lifeline operation mode.

15. The improved DSL communication apparatus according to claim 1 wherein said control unit is further configured to generate a control signal, said control signal depending on a state of said local power supply unit and being supplied to a selection unit, said selection unit being coupled both to said local power supply unit and said auxiliary power supply unit, said selection unit selecting either said local supply voltage provided by said local power supply unit or said auxiliary supply voltage provided by said auxiliary power supply unit as a supply voltage for said DSL communication apparatus, depending on said control signal.

16. The improved DSL communication apparatus according to claim 15 further comprising:
 a parallel port, said parallel port configured to supply said control signal to said selection unit.

17. The improved DSL communication apparatus according to claim 15 wherein said control unit changes said status of said control signal between a high level and a low level depending on said state of said local power supply unit.

18. The improved DSL communication apparatus according to claim 1 further comprising:
 a general purpose timer unit through which said control unit monitors said status of said local power supply unit by evaluating a status signal of said local power supply unit.

19. The improved DSL communication apparatus according to claim 1 wherein said voice signal interface unit is configured for transmitting analogue voice signals to analogue subscriber terminal equipment and for receiving analogue voice signals from said analogue subscriber terminal equipment.

20. The improved DSL communication apparatus according to claim 1 wherein said voice signal interface unit is configured for transmitting ISDN voice signals to ISDN subscriber terminal equipment and receiving ISDN voice signals from said ISDN subscriber terminal equipment.

21. The improved DSL communication apparatus according to claim 1 wherein said DSL transceiver unit is an SHDSL/SDSL transceiver unit for transmitting and receiving SHDSL/SDSL signals over said transmission line.

22. The improved DSL communication apparatus according to claim 1 wherein said DSL communication apparatus is configured for transmitting and receiving CVoDSL signals through said DSL transceiver unit and said transmission line.

* * * * *